(12) United States Patent
Fulcher (10) Patent No.: US 8,622,782 B2
(45) Date of Patent: Jan. 7, 2014

(54) COMBINATION WILDLIFE CALL

(75) Inventor: Daniel B. Fulcher, Spring Hill, TN (US)

(73) Assignee: Cherokee Sports, LLC, Spring Hill, TN (US)

( * ) Notice: Subject to any disclaimer, the term of this patent is extended or adjusted under 35 U.S.C. 154(b) by 186 days.

(21) Appl. No.: 13/049,385

(22) Filed: Mar. 16, 2011

(65) Prior Publication Data

US 2012/0238180 A1    Sep. 20, 2012

(51) Int. Cl.
*A63H 5/00* (2006.01)
*A63H 1/28* (2006.01)

(52) U.S. Cl.
USPC ........................................... 446/207; 84/330

(58) Field of Classification Search
USPC ........ 446/202, 204–209, 397; 84/330, 380 R; 116/137 R
See application file for complete search history.

(56) References Cited

U.S. PATENT DOCUMENTS

| 2,396,359 | A | 3/1946 | Yager |
| 2,518,616 | A | 8/1950 | Herter |
| 3,029,554 | A | 4/1962 | Mobley |
| 4,050,186 | A | 9/1977 | Shults et al. |
| 4,211,031 | A | 7/1980 | Gambino |
| 4,950,198 | A | 8/1990 | Repko, Jr. |
| 4,950,201 | A | 8/1990 | Sceery |
| 6,413,139 | B1 * | 7/2002 | Douglas .................. 446/204 |
| 7,037,167 | B2 | 5/2006 | Primos et al. |
| 7,074,107 | B2 * | 7/2006 | Saso ....................... 446/204 |

* cited by examiner

*Primary Examiner* — Kien Nguyen
(74) *Attorney, Agent, or Firm* — Sterne, Kessler, Goldstein & Fox P.L.L.C.

(57) ABSTRACT

A combination wildlife call has a first call member with a first body portion having an air inlet and a second portion having an air outlet for generating a first wildlife call when air passes through the first call member. A second call member has a second body portion fixed to the first body portion at an angle thereto. The second body portion has an air inlet and a third portion having an air outlet for generating a second wildlife call when air passes through the second call member.

18 Claims, 6 Drawing Sheets

COMBINATION WILDLIFE CALL

BACKGROUND OF THE INVENTION

1. Field of the Invention

The invention relates to the field of wildlife calls.

2. Background of the Disclosure

Many devices are known for mimicking the calls of animals and game birds, primarily for the purpose of luring the animals or birds into proximity with hunters or birdwatchers. Generally speaking, these known devices have included a hollow tubular body having a mouthpiece or blow hole at one end and at least one reed assembly within the tubular body for producing the desired sound when activated by the air stream directed therethrough.

In many situations it is advantageous to have an animal or bird call which can mimic the sounds of more than one animal or bird species. For example, a hunter requires a call which can mimic the different sounds of various geese as well as the various duck species which may be hunted. Or the hunter may want to mimic the sound of elk in addition to moose, or other game animals. In the known devices, some animal or bird calls have included two or more reed assemblies within the same tubular body to create these differing sounds. These devices included stops, lever arrangements, or finger holes to direct the airstream to the reed assembly or assemblies which produce the desired sound. These devices have tended to become overly complicated and difficult to master. Furthermore, the increased complexity of these devices makes them more difficult to operate in the harsh field conditions in which they are often used.

Many such calls are effectively wind instruments. The basic bird and animal call has not changed significantly for the last hundred years or more. The user blows through a mouthpiece at one end of the device. A vibrating reed in a channel of the device responds to the wind force by vibrating to create the sound that emerges from the outlet port at the other end of the device. The mouth of the user does not actually come into contact with the reed. Control of the sound production comes from the user's adjustment of the input wind velocity, modulation of wind velocity by lip movement and by action upon the output sound waves by use of a hand curled around the outlet.

BRIEF SUMMARY

A combination wildlife call has a first call member with a first body portion having an air inlet and a second portion having an air outlet for generating a first wildlife call when air passes through the first call member. A second call member has a first body portion fixed to the first body portion at an angle thereto. The first body portion of the second call member has an air inlet and a second portion having an air outlet for generating a second wildlife call when air passes through the second call member.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF EMBODIMENTS

The following detailed description refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above", "below", "left," "right," "up", "down", "top", "bottom", etc.) used herein are for purposes of illustration only, and that practical implementations of the structures described herein can be spatially arranged in any orientation or manner.

Figure 1:
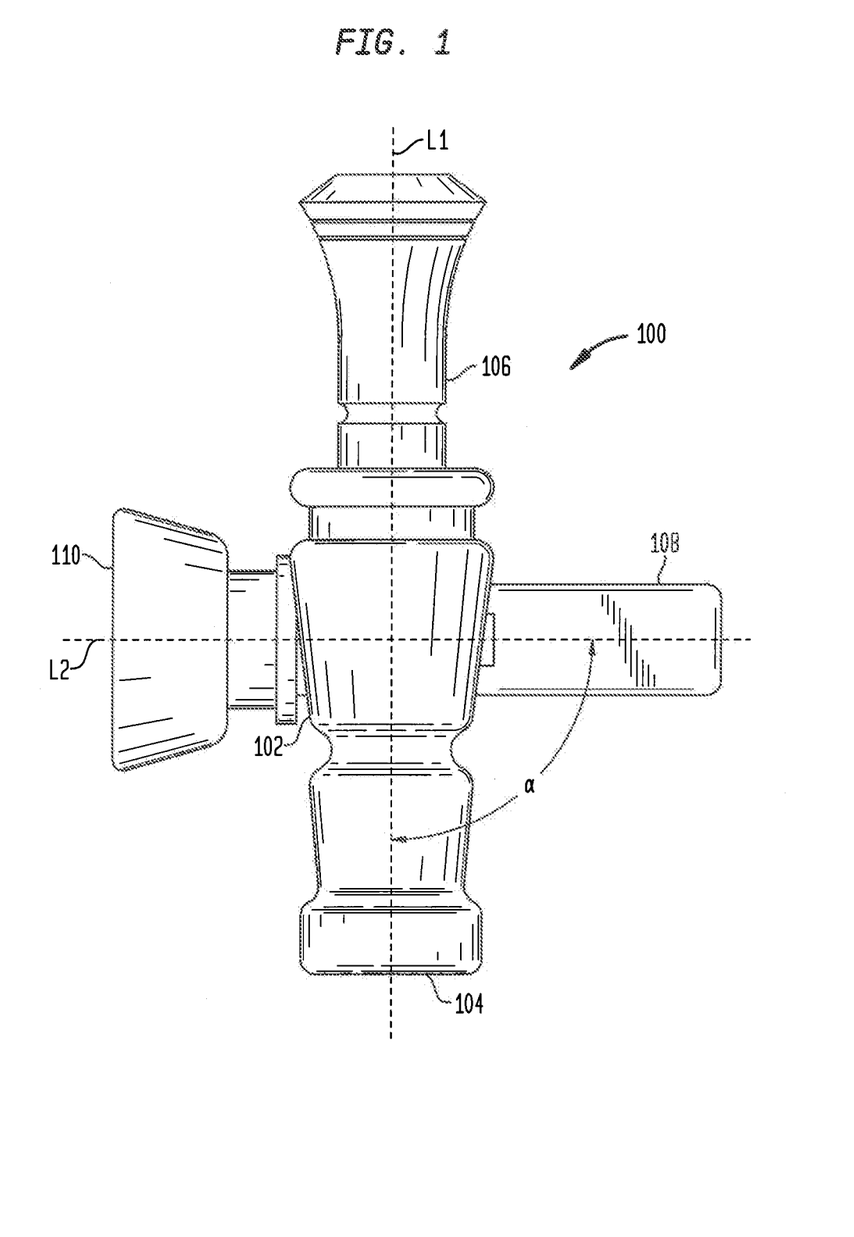
FIG. 1 shows a plan view of a first embodiment of a wildlife call.
Figure 2:
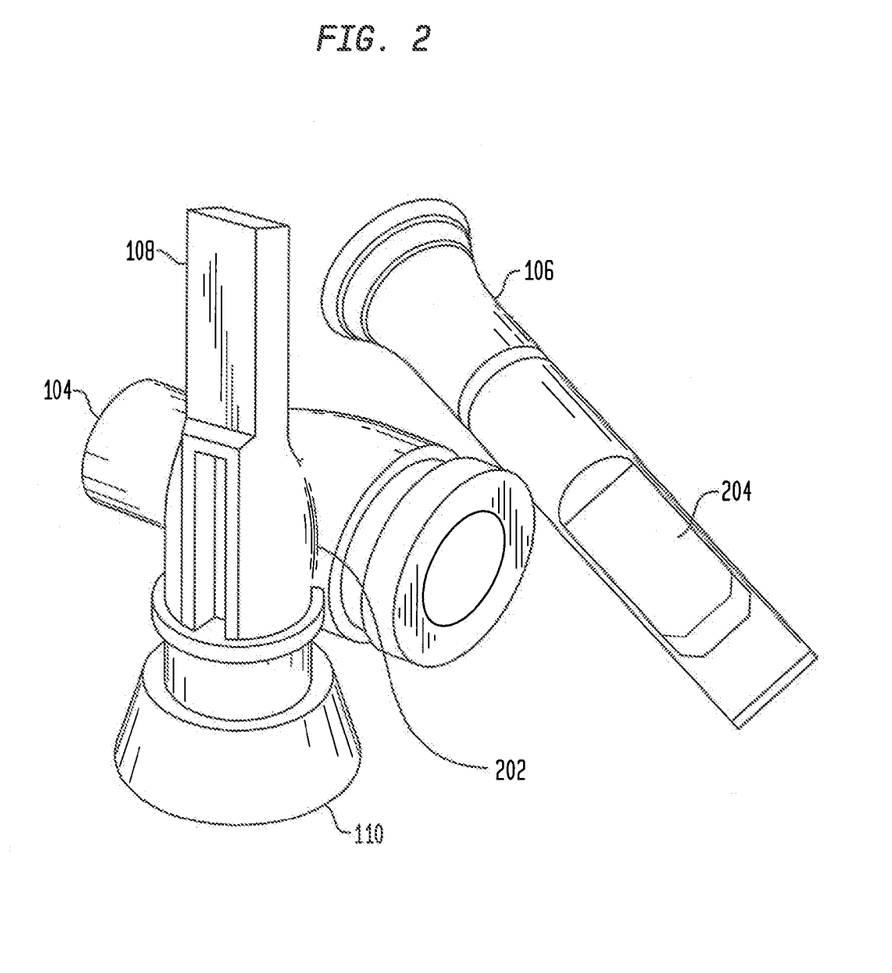
FIG. 2 shows the wildlife call of FIG. 1 with parts separated.
Figure 3:
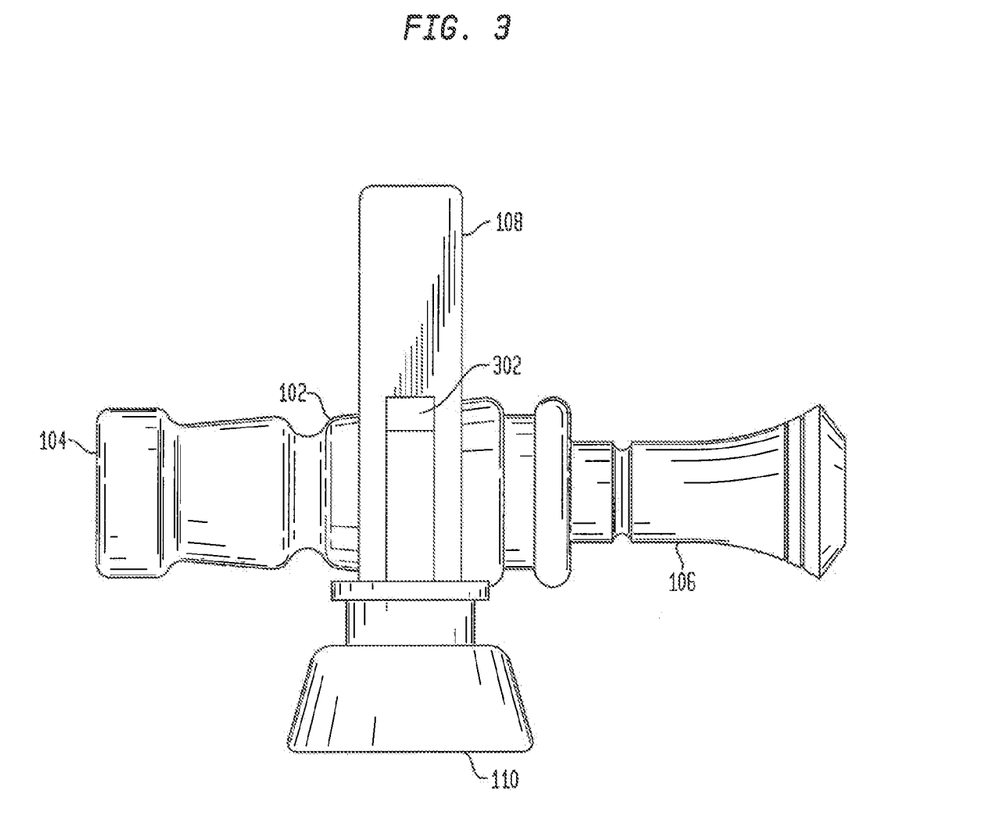
FIG. 3 shows a further plan view of the embodiment of FIG. 1.

FIGS. 1-3 show a first embodiment 100 of the wildlife call incorporating features of the invention. Wildlife call 100 has a first or main body portion 102. One end of body portion 102 comprises a first mouthpiece portion 104. A sound emitting or voice unit 106 is affixed to the opposite end portion of body portion 102 from mouthpiece portion 104. Sound emitting unit 106 may be permanently affixed to body portion 102, e.g., as a single molded part, or by gluing, or welding, or any other suitable means that would be apparent to one skilled in the relevant arts. Alternatively, sound emitting unit 106 may be removably affixed to body portion 102, e.g., by press fitting, or a screw fit arrangement, or by any other removable mounting arrangement that would be apparent to one skilled in the relevant arts. A first longitudinal axis L1 extends through first body portion 102 and sound emitting portion 106.

Wildlife call 100 also has a second body portion 108 and a second mouthpiece portion 110. A second longitudinal axis L2 extends through second body portion 108 and second mouthpiece portion 110. Second body portion 108 is fixed or integrally secured to first body portion 102 at joinder portion 202. Body portions 102 and 108 are advantageously molded as a single part. However, it would be apparent to one skilled in the relevant art that body portions 102 and 108 may be formed as separate parts and glued, soldered, welded or otherwise fixed to each other in any other suitable manner.

Sound emitting unit 106 typically contains a reed assembly 204. Reed assembly produces a desired sound when sound emitting unit 106 is fitted into body portion 102 and air passes through mouthpiece portion 104. Reed assemblies and like sound emitting devices as used in wildlife calls are well known and will not be described in further detail here.

As shown in FIG. 3, second body portion 108 has an air emitting opening 302 formed therein. When air passes through mouthpiece portion 110, air is emitted from opening 302, typically causing a whistling sound. Air emitting opening 302 may be formed in a shape to emit a bird or animal call as desired, in a manner known to those skilled in the relevant arts.

Body portions 102 and 108 are oriented with respect to each other such that their respective longitudinal axes L1 and L2 are disposed at an angle $\alpha$, which is greater than 0° and no greater than 90° to each other. In one embodiment as shown, body portions 102 and 108 are disposed at an angle $\alpha$ of about 90° with respect to each other. However, body portions 102 and 108 may be disposed at any suitable angle greater than 0°.

Figure 4:
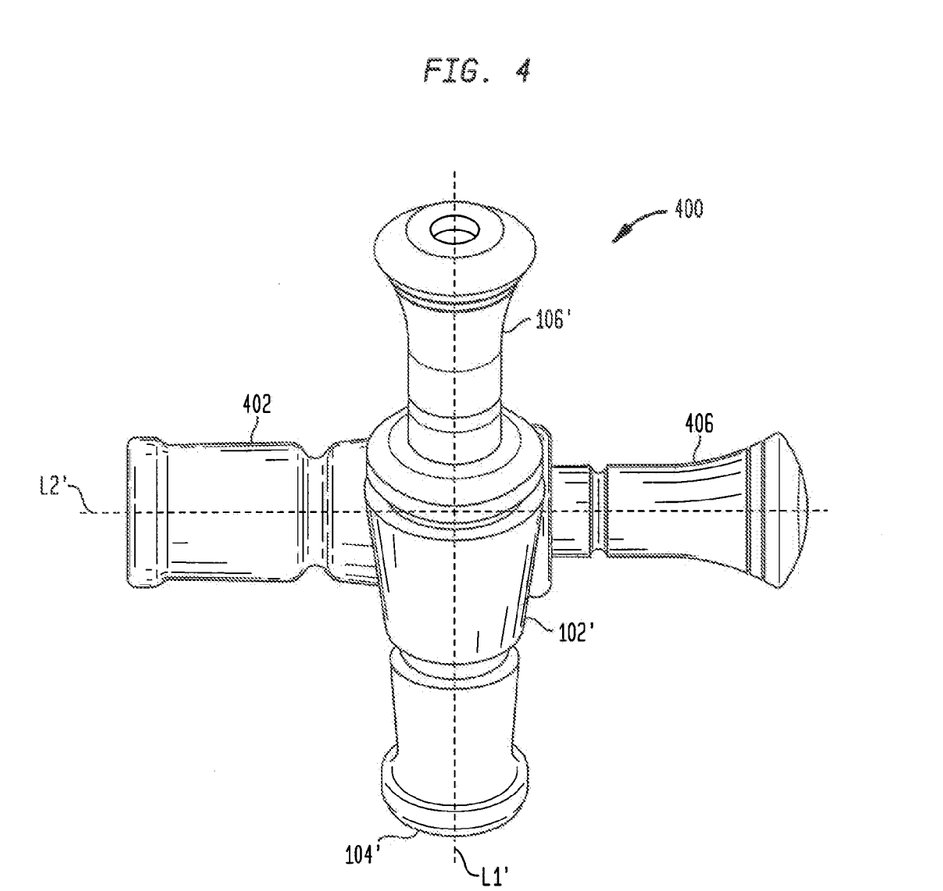
FIG. 4 shows a plan view of a second embodiment of a wildlife call.

FIG. 4 shows a second embodiment 400 of a wildlife call incorporating features of the invention. Wildlife call 400 has a first body portion 102', one end of which forms a first mouthpiece portion 104'. A sound or voice emitting unit 106' is affixed to the opposite end of body portion 102' from mouthpiece portion 104'. A first longitudinal axis L1' extends through body portion 102' and first sound emitting unit 106'.

Wildlife call 400 has a second body portion 402 and a second mouthpiece portion 404. A second sound or voice emitting unit 406 is affixed to the opposite end of body portion 402 from mouthpiece portion 404. A second longitudinal axis L2' extends through body portion 402 and sound emitting unit 406.

Sound emitting units 106' and 406 may be permanently affixed to body portions 102' and 402, respectively, e.g., as a single molded part, or by gluing, or welding, or any other suitable means that would be apparent to one skilled in the relevant arts. Alternatively, sound emitting units 106' and 406 may be removably affixed to body portions 102' and 402, respectively, e.g., by press fitting, or a screw fit arrangement, or by any other removable mounting arrangement that would be apparent to one skilled in the relevant arts.

Sound emitting units 106' and 406 typically contain reed assemblies similar to reed assembly 204. The reed assembly in sound emitting unit 106' is constructed to produce a desired sound when sound emitting unit 106' is fitted into body portion 102' and air passes through mouthpiece portion 104'. The reed assembly in sound emitting unit 406 is typically constructed to produce a different sound when air passes through mouthpiece portion 404 than is produced by sound emitting unit 106' Reed assemblies and like sound emitting devices as used in wildlife calls are well known and will not be described in further detail here.

Second body portion 402 is fixed or integrally secured to first body portion 102' at a joinder portion (not shown, but similar to joinder portion 202 shown in FIG. 2). Body portions 102' and 402 are advantageously molded as a single part. However, it would be apparent to one skilled in the relevant art that body portions 102' and 402 may be formed as separate parts and glued, soldered, welded or otherwise fixed to each other in any other suitable manner.

Body portions 102' and 402 are oriented with respect to each other such that their respective longitudinal axes are disposed at an angle $\alpha'$, which is greater than 0° and no greater than 90° to each other. In one embodiment as shown, body portions 102' and 402 are disposed at an angle $\alpha'$ of about 90° with respect to each other. However, body portions 102' and 402 may be disposed at any suitable angle greater than 0°.

Figure 5:
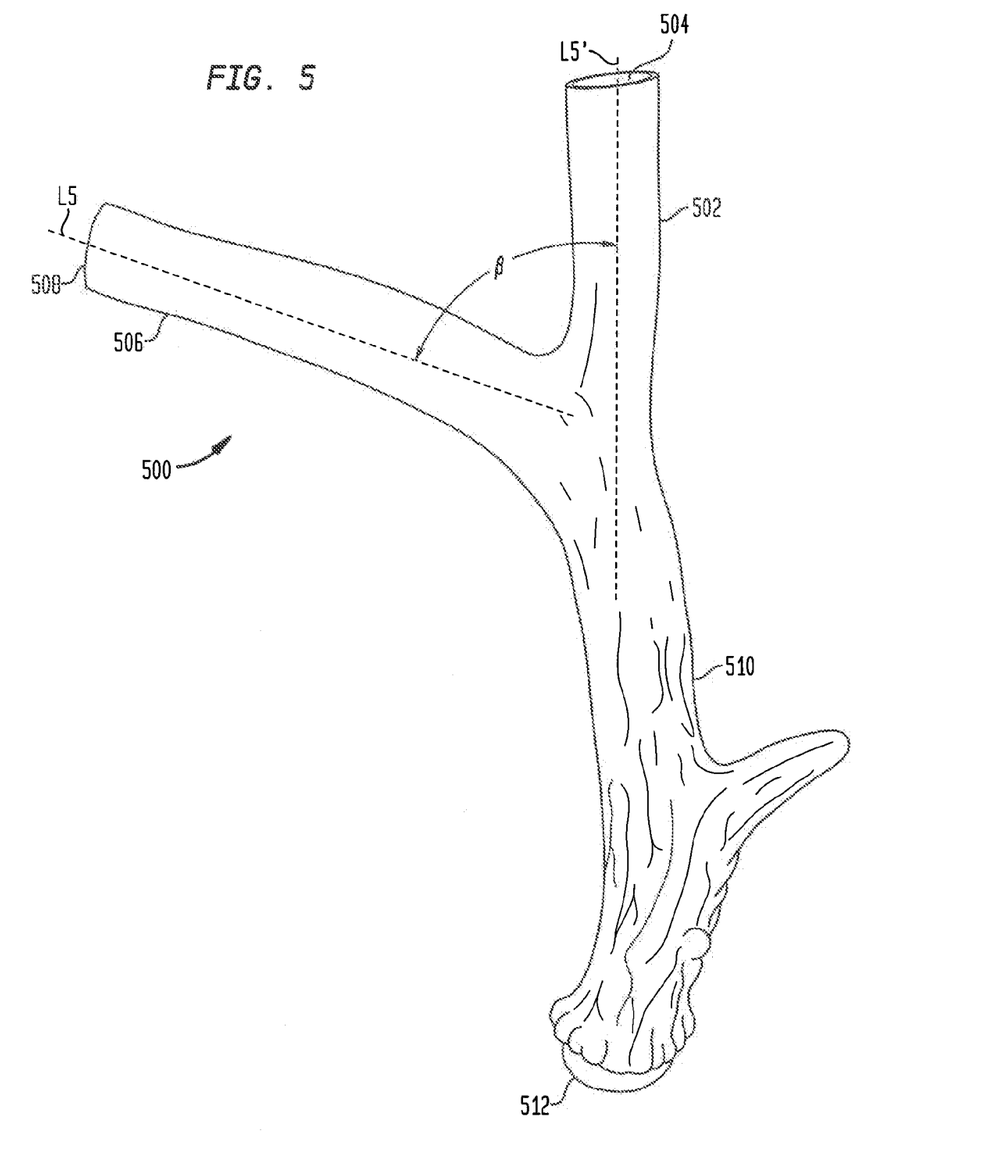
FIG. 5 shows a plan view of a third embodiment of a wildlife call.

A further embodiment 500 of a wildlife call incorporating features of the invention is shown in FIG. 5. A first body portion 502 includes a first mouthpiece portion 504. A second body portion 506 includes a second mouthpiece portion 508. Body portions 502 and 504 are configured to each feed into a single outlet portion 510 having an air outlet 512. Each body portion 502 and 506 contains its own reed or other sound producing assembly (not shown). When air passes through either mouthpiece portion 504 or 508, the corresponding sound producing assembly produces the appropriate sound that is emitted from the air outlet end 512 of sound emitting unit 510.

Wildlife call 500 is shown as having the shape of an antler. However, it should be clear that any comparable shape, in which two body portions, each having a sound generating assembly in it, feed into a single sound emitting or outlet portion, can be used.

The sound producing assemblies located in body portions 502 and 404 typically contain reed assemblies similar to reed assembly 204. The reed assembly in body portion 502 will be constructed to produce a desired sound when air passes through mouthpiece portion 504. The reed assembly in body portion 506 will typically be constructed to produce a different sound when air passes through mouthpiece portion 508 than is produced by the sound emitting assembly in body portion 502. Reed assemblies and like sound emitting devices as used in wildlife calls are well known and will not be described in further detail here.

Body portions 502 and 506 are oriented with respect to each other such that their respective longitudinal axes L5 and L5' are disposed at an angle $\beta$ greater than 0° and no greater than 90° to each other. In one embodiment as shown, body portions 502 and 506 are disposed at an angle $\beta$ of about 45° with respect to each other. However, body portions 502' and 506 may be disposed relative to each other at any suitable angle greater than 0°.

Figures 6A, 6B:
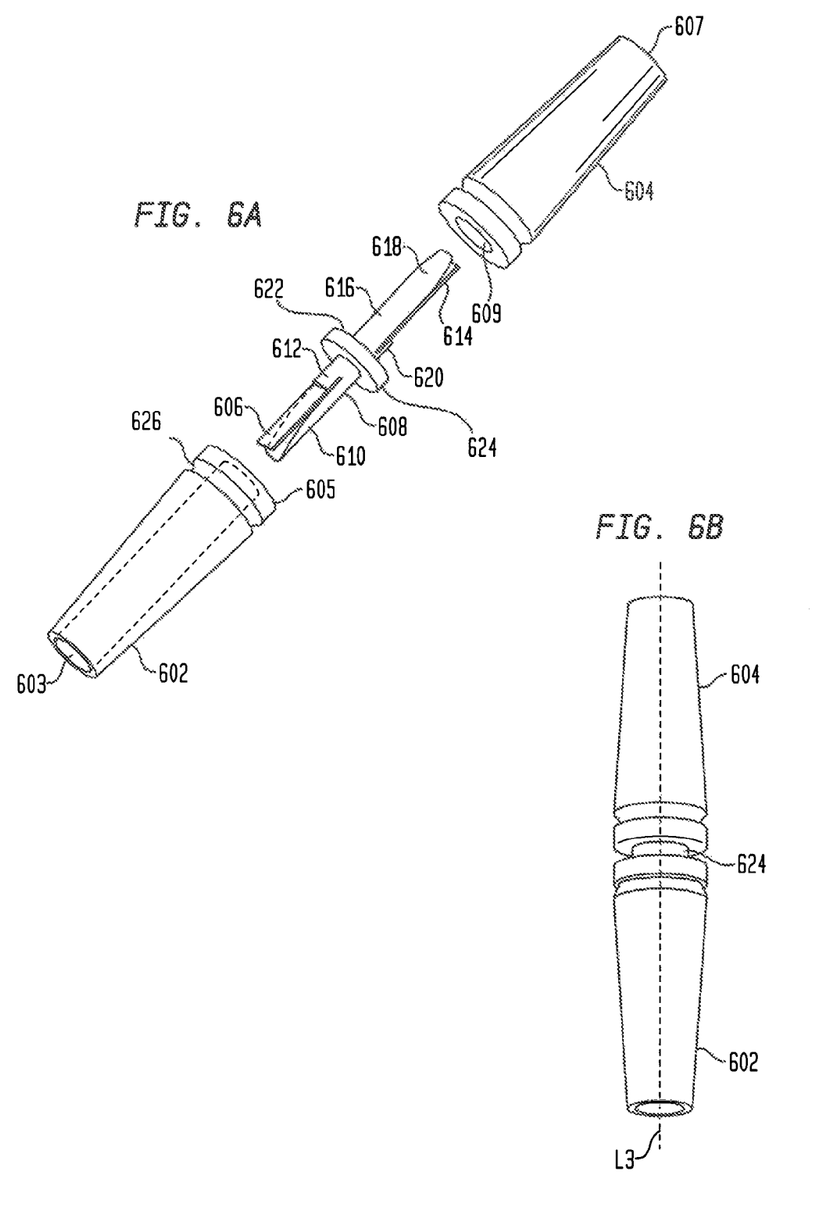
FIG. 6A shows an exploded view of a fourth embodiment of a wildlife call.
FIG. 6B shows the wildlife call of FIG. 6A with all parts connected.

A still further embodiment 600 of a wildlife call incorporating features of the invention is shown in FIGS. 6A and 6B. Wildlife call 600 has a first body portion 602 having a first open or mouthpiece end portion 603 and a second open end portion 605. A second body portion 604 has a first open or mouthpiece end portion 607 and a second open end portion 609. Body portions 602 and 604 each have open air passages therethrough between their respective first and second open end portions.

A first reed 606 is affixed to a first reed holder 608. First reed holder 608 has a trough 610 therein and a first wedge 612 for holding reed 606 in place. A second reed 614 is affixed to a second reed holder 616. Second reed holder 616 has a trough 618 therein and a second wedge 620 for holding reed 614 in place. Wedges 612 and 620 may be any suitable member or device that attaches reeds 606 and 618 to their respective reed holders 608 and 616.

When reed holders 608 and 616 are secured to each other, troughs 610 and 618 define a common air hole or passage 622 through the secured reed holders. A ring 624 is fitted around reed holders 608 and 616 to help hold reed holders 608 and 616 in place. In addition ring 624 mates with first and second open end portions 605 and 609 to seal body portions 602 and 604 together to form a unitary structure along a common longitudinal axis L3. When body portions 602 and 604 are formed into a unitary structure, first reed 606 will be disposed in body portion 602 and second reed 614 will be disposed in body portion 604. Finally, a lanyard groove 626 may be formed in one or both body portions 602 and 604 to secure a lanyard to the combination wildlife call.

Wildlife call 600 allows two different calls to be made by blowing into respective mouthpiece portions 605 and 609. When air is blown into mouthpiece portion 605, reed 606 is actuated to produce a first sound. This first sound is transmitted through air hole 622 and emerges from mouthpiece portion 607, which now acts as a sound emitting portion. Likewise, when air is blown into mouthpiece portion 607, reed 614 is actuated to produce a second sound. This second sound is transmitted through air hole 622 and emerges from mouthpiece portion 605, which now acts as a sound emitting portion. Reeds 606 and 614 are advantageously constructed to produce two different sounds.

All of the embodiments of this invention have the common feature that two different wildlife calls can be produced from a single device. The single device comprises two different sound producing assemblies incorporated into a unitary structure. This arrangement is advantageous to hunters, wildlife photographers, birdwatchers, etc. Typically wildlife calls are worn around the neck on a lanyard to be within easy reach. Rather than carry around multiple calling devices, a user can carry one device that will produce multiple calls. It is only necessary to twist the one device to use the two different mouthpieces and generate two different calls.

In addition, in any of the embodiments, sounds can be produced by either exhaling into the mouthpiece portion or inhaling through the mouthpiece portion. Moreover, the word "air" as used herein can mean any suitable gaseous material that will produce a sound from any of the embodiments of the combination wildlife call. Also, the combination calls of the several embodiments may be constructed of wood, plastic, or any other suitable material typically used in the construction of wildlife calls.

Of course it will be apparent to one skilled in the relevant arts that more than two calls can be integrated into a single device. There is no real limitation on the number of calls that can be integrated other than the practical limitations of size and weight.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A combination wildlife call, comprising:
a first call member having a first body portion with an air inlet and a second portion having an air outlet for generating a first sound when air passes through the air inlet of the first call member, the first and second portions lying along a first common longitudinal axis; and
a second call member having a first body portion with an air inlet and a second portion having an air outlet for generating a second sound that is different from the first sound when air passes through the air inlet of the second call member, the first and second portions of the second call member lying along a second common longitudinal axis;
wherein the second call member is fixed to the first call member such that the first and second longitudinal axes are disposed at an angle greater than 0° and no greater than 90°.

2. The combination wildlife call of claim 1, further comprising a reed assembly fitted into the second portion of the first call member to generate a wildlife call when air passes through the air inlet of the first call member.

3. The combination wildlife call of claim 2, further comprising an air exit opening in the second portion of the second call member to generate a whistle sound when air passes through the air inlet of the second call member.

4. The combination wildlife call of claim 2, further comprising a second reed assembly fitted into the second portion of the second call member to generate a wildlife call different from the first wildlife call when air passes through the air inlet of the second call member.

5. The combination wildlife call of claim 1, wherein the first and second call members are integrally formed from a unitary piece of material.

6. The combination wildlife call of claim 1, wherein the first call member is configured a first sound when air is blown into the air inlet of the first call member and the second call member, is configured to produce a second sound, different from the first sound, when air is blown into the air inlet of the second call member.

7. A combination wildlife call, comprising:
a first body member having a first air inlet;
a first sound producing member disposed in the first body member in the path of airflow entering the first air inlet;
a second body member having a second air inlet;
a second sound producing member disposed in the second body member in the path of airflow entering the second air inlet; and
a third body member integrally coupled to the first and second body members downstream of the first and second sound producing members and having an air outlet for generating a sound when air passes through one of the first and second air inlets.

8. The combination wildlife call of claim 7, wherein the first and second sound producing members are configured to produce sounds that are different from each other.

9. The combination wildlife call of claim 7, wherein:
the first sound producing member comprises a first reed assembly; and
the second sound producing member comprises a second reed assembly.

10. The combination wildlife call of claim 9, wherein the first and second reed assemblies are constructed to produce different sounds.

11. The combination wildlife call of claim 7, wherein the first and second call members are integrally formed from a unitary piece of material.

12. The combination wildlife call of claim 7, wherein the first air inlet is configured to produce a first sound when air is blown into the first air inlet and the second air inlet is configured to produce a second sound, different from the first sound, when air is blown into the second air inlet.

13. A combination wildlife call, comprising:
- a first body portion having a first open end, a second open end, and an open air passage between the first body portion first and second open ends;
- a second body portion having a first open end, a second open end, and an open air passage between the second body portion first and second open ends;
- a first sound producing member disposed in the first body portion and configured to produce a first sound;
- a second sound producing member disposed in the second body portion and configured to produce a second sound that is different from the first sound; and
- a securing member configured to secure the second end portions of the first and second body portions to each other along a common longitudinal axis;
- wherein,
  - the first sound producing member is configured to produce a sound that is emitted from the first open end of the second body member when air passes through the first open end of the first body portion; and
  - the second sound producing member is configured to produce a sound that is emitted from the first open end of the first body member when air passes through the first open end of the second body portion.

14. The combination wildlife call of claim 13, wherein:
the first sound producing member comprises a first reed disposed in the open air passage of the first body portion between the first and second open ends of the first body portion; and
the second sound producing member comprises a second reed disposed in the open air passage of the second body portion between the first and second open ends of the second body portion.

15. The combination wildlife call of claim 14, further comprising:
- a first reed mounting assembly comprising a first member having a first trough therein and a means for mounting the first reed to the first reed mounting assembly;
- a second reed mounting assembly comprising a second member having a second trough therein and a means for mounting the second reed to the second reed mounting assembly; and
- the first and second troughs defining an air passage extending through the wildlife call between the first open end of the first body portion and the first open end of the second body portion.

16. The combination wildlife call of claim 15, wherein the securing member comprises:
- a ring member disposed around the first and second reed mounting assemblies and configured to be coupled to the second ends of the first and second body members.

17. The combination wildlife call of claim 13, wherein the first and second call members are integrally formed from a unitary piece of material.

18. The combination wildlife call of claim 13, wherein the first body is configured to produce a first sound when air is blown into the first open end of the first body member and the second body portion is configured to produce a second sound, different from the first sound, when air is blown into the first open end of the second body member.

* * * * *